(12) United States Patent
Uyehara et al.

(10) Patent No.: US 10,652,955 B2
(45) Date of Patent: *May 12, 2020

(54) DAS MANAGEMENT BY RADIO ACCESS NETWORK NODE

(71) Applicant: CommScope Technologies LLC, Hickory, NC (US)

(72) Inventors: Lance K. Uyehara, San Jose, CA (US); Boris Golubovic, San Francisco, CA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,442

(22) Filed: May 21, 2018

(65) Prior Publication Data

US 2018/0270903 A1 Sep. 20, 2018

Related U.S. Application Data

(63) Continuation of application No. 15/071,691, filed on Mar. 16, 2016, now Pat. No. 9,980,318.

(60) Provisional application No. 62/133,853, filed on Mar. 16, 2015.

(51) Int. Cl.
*H04W 4/00* (2018.01)
*H04W 88/08* (2009.01)
*H04W 24/02* (2009.01)
*H04W 88/02* (2009.01)
*H04L 12/24* (2006.01)
*H04M 1/725* (2006.01)

(52) U.S. Cl.
CPC ......... *H04W 88/085* (2013.01); *H04W 24/02* (2013.01); *H04L 41/12* (2013.01); *H04M 1/72519* (2013.01); *H04M 1/72522* (2013.01); *H04W 88/02* (2013.01)

(58) Field of Classification Search
CPC ...... H04L 41/12; H04W 88/02; H04W 72/04; H04W 88/08; H04W 16/28; H04W 28/04
USPC .......................... 455/422.1, 562.1, 561, 450
See application file for complete search history.

(56) References Cited

U.S. PATENT DOCUMENTS

| | | |
|---|---|---|
| 6,349,200 B1 | 2/2002 | Sabat, Jr. et al. |
| 6,831,901 B2 | 12/2004 | Millar |
| 6,963,552 B2 | 11/2005 | Sabat et al. |
| 7,215,651 B2 | 5/2007 | Millar |
| 7,313,626 B2 | 12/2007 | Sabat, Jr. et al. |

(Continued)

FOREIGN PATENT DOCUMENTS

KR 20140037912 A 3/2014

OTHER PUBLICATIONS

European Patent Office, "Extended European Search Report from EP Application No. 16765630.5 dated Jul. 9, 2018", from Foreign Counterpart to U.S. Appl. No. 15/071,691, pp. 1-12, Published: EP.

(Continued)

*Primary Examiner* — Danh C Le
(74) *Attorney, Agent, or Firm* — Fogg & Powers LLC

(57) ABSTRACT

Embodiments described herein provide for a distributed antenna system (DAS) including a host unit and a plurality of active antenna units (AAUs). The host unit is configured to send management information to the one or more RAN nodes. The one or more RAN nodes are configured to manage the RF signals based on the management information.

19 Claims, 2 Drawing Sheets

(56) References Cited

U.S. PATENT DOCUMENTS

| | | |
|---|---|---|
| 7,702,985 B2 | 4/2010 | Millar |
| 7,761,093 B2 | 7/2010 | Sabat, Jr. et al. |
| 7,920,858 B2 | 4/2011 | Sabat, Jr. et al. |
| 7,991,903 B2 | 8/2011 | Sabat, Jr. et al. |
| 8,160,570 B2 | 4/2012 | Sabat, Jr. et al. |
| 8,290,483 B2 | 10/2012 | Sabat, Jr. et al. |
| 8,559,939 B2 | 10/2013 | Sabat, Jr. et al. |
| 8,737,300 B2 | 5/2014 | Stapleton et al. |
| 8,762,510 B2 | 6/2014 | Sabat, Jr. et al. |
| 8,855,036 B2 | 10/2014 | Sabat et al. |
| 9,980,318 B2 | 5/2018 | Uyehara et al. |
| 2009/0061940 A1 | 3/2009 | Scheinert et al. |
| 2010/0177760 A1 | 7/2010 | Cannon et al. |
| 2012/0008696 A1 | 1/2012 | Wegener |
| 2012/0281565 A1 | 11/2012 | Sauer |
| 2013/0243346 A1* | 9/2013 | Cho ................ G06T 5/003 382/255 |
| 2013/0260705 A1* | 10/2013 | Stratford ............. H04B 17/12 455/226.1 |
| 2013/0265889 A1* | 10/2013 | Buckley ............. H01Q 1/241 370/252 |
| 2014/0011443 A1 | 1/2014 | Lu et al. |
| 2014/0024402 A1 | 1/2014 | Singh |
| 2014/0036780 A1 | 2/2014 | Sabat, Jr. et al. |
| 2014/0092771 A1* | 4/2014 | Siomina ............. H04W 24/08 370/252 |
| 2014/0120870 A1 | 5/2014 | Sabat, Jr. et al. |
| 2014/0140225 A1 | 5/2014 | Wala |
| 2015/0011236 A1* | 1/2015 | Kazmi ............... H04B 17/27 455/456.1 |
| 2015/0257118 A1* | 9/2015 | Siomina ............. G01S 5/021 455/456.1 |
| 2015/0271793 A1 | 9/2015 | Fischer et al. |
| 2015/0365502 A1 | 12/2015 | Uyehara et al. |
| 2016/0044518 A1* | 2/2016 | Centonza ............ H04W 24/02 370/328 |
| 2016/0127003 A1 | 5/2016 | Xu et al. |
| 2016/0134353 A1* | 5/2016 | Lange ............... H04W 56/004 370/345 |
| 2016/0135184 A1 | 5/2016 | Zavadsky et al. |
| 2016/0353291 A1* | 12/2016 | Tarlazzi ............. H04B 17/19 |

OTHER PUBLICATIONS

International Bureau, "International Preliminary Report on Patentability from PCT Application No. PCT/US2016/022588 dated Sep. 28, 2017", from Foreign Counterpart to U.S. Appl. No. 15/071,691, pp. 1-14, Published: WO.

International Searching Authority, "International Search Report and the Written Opinion from PCT Application No. PCT/US2016/022588 dated Jul. 8, 2016", from Foreign Counterpart to U.S. Appl. No. 15/071,691, pp. 1-18, Published: KR.

U.S. Patent and Trademark Office, "Corrected Notice of Allowability", U.S. Appl. No. 15/071,691, dated Feb. 26, 2018, pp. 1-5, Published: US.

U.S. Patent and Trademark Office, "Notice of Allowance", U.S. Appl. No. 15/071,691, dated Jan. 19, 2018, pp. 1-8, Published: US.

U.S. Patent and Trademark Office, "Office Action", U.S. Appl. No. 15/071,691, dated Mar. 2, 2017, pp. 1-22, Published: US.

U.S. Patent and Trademark Office, "Office Action", U.S. Appl. No. 15/071,691, dated Aug. 21, 2017, pp. 1-12, Published: US.

European Patent Office, "Communication pursuant to Article 94(3) from EP Application No. 16765630.5 dated Jul. 5, 2019", from Foreign Counterpart to U.S. Appl. No. 15/071,691, pp. 1-6, Published: EP.

* cited by examiner

DAS MANAGEMENT BY RADIO ACCESS NETWORK NODE

CROSS-REFERENCE TO RELATED APPLICATIONS

This application is a continuation of U.S. patent application Ser. No. 15/071,691 filed on Mar. 16, 2016 and titled "DAS MANAGEMENT BY RADIO ACCESS NETWORK NODE" which claims the benefit of U.S. Provisional Patent Application Ser. No. 62/133,853, filed on Mar. 16, 2015, both of which are hereby incorporated herein by reference in their entirety.

BACKGROUND

A conventional distributed antenna system (DAS) provides indoor or outdoor coverage for wireless communications. Transmitted signals are distributed among several antennas in separate locations to provide enhanced coverage as opposed to a single location transmitter. The DAS is coupled downstream of a radio access network (RAN), that is controlled by a wireless service operator (e.g., Sprint, Verizon, etc.). The radio access network resides between a core network (e.g., packet core) and the DAS, and includes a plurality of nodes for implementing a radio access technology. Example radio access networks include the GSM radio access network (GRAN), GSM Edge radio access network (GERAN), the Universal Terrestrial radio access network (UTRAN), and the Evolved Universal Terrestrial radio access network (E-UTRAN).

The DAS interacts with one or more of the RAN nodes within the RAN network and external to the DAS. The DAS distributes downlink signals for the RAN node(s) and receives uplink signals for the RAN node(s). A conventional DAS is controlled independently of the RAN, and the RAN may not be aware of the presence of the DAS. In such a setup there are aspects of how signals are sent and received by the DAS that are outside of the RAN's control.

SUMMARY

Embodiments described herein provide for a distributed antenna system (DAS) including a host unit and a plurality of active antenna units (AAUs). The host unit is configured to send management information to the one or more RAN nodes. The one or more RAN nodes are configured to manage the RF signals based on the management information.

DRAWINGS

Understanding that the drawings depict only examples and are not therefore to be considered limiting in scope, the examples will be described with additional specificity and detail through the use of the accompanying drawings.

In accordance with common practice, the various described features are not drawn to scale but are drawn to emphasize specific features relevant to the examples. Like reference numbers and designations in the various drawings indicate like elements.

DETAILED DESCRIPTION

Embodiments described below relate to a distributed antenna system (DAS) that is configured to communicate with one or more radio access network (RAN) nodes to provide management information pertaining to the DAS, such as status and configuration information, to the RAN node. The RAN node can use the management information to manage the RF signals sent and received. Embodiments described below also relate to a DAS that is configured to receive a command from a RAN node. The DAS can also be enabled to adjust its operation in response to the command. The RAN node can then use these commands to control certain aspects of the DAS.

Figure 1:
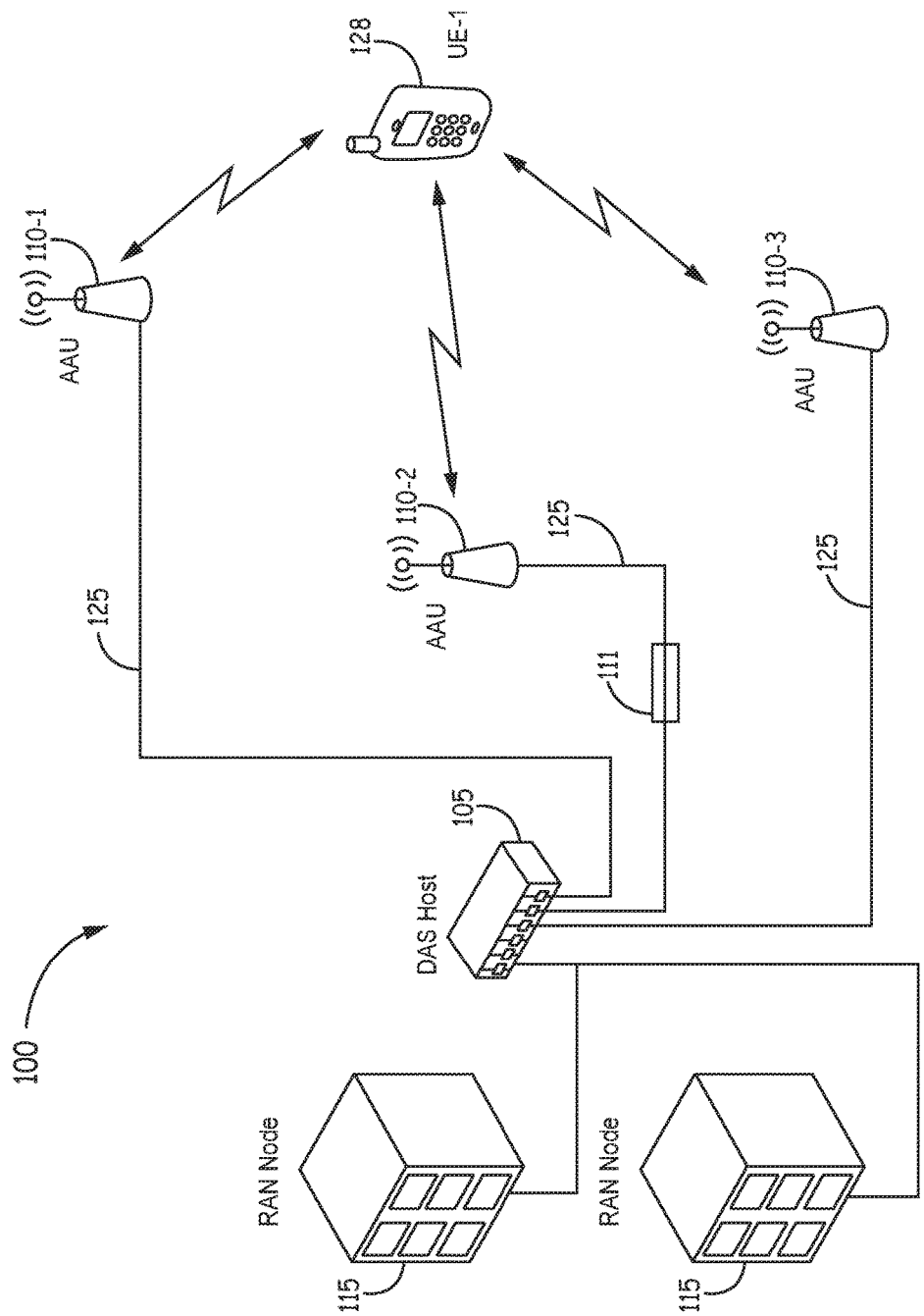
FIG. 1 is a block diagram of an example distributed antenna system (DAS) coupled to a plurality of radio access network (RAN) nodes.

FIG. 1 is a block diagram of an example DAS 100. DAS 100 comprises a host unit 105 coupled to a plurality of active antenna units (shown at 110-1 to 110-n). Active antenna units (AAUs) may be directly coupled to a host unit, such as shown for active antenna unit 110-1. Alternatively, in some implementations, one or more of the active antenna units may be indirectly coupled to host unit 105, such as shown for active antenna unit 110-2, where there is at least one intervening device 111 (which may comprise an intermediate or expansion unit, for example).

In the downlink direction, DAS 100 operates as a point-to-multipoint transport for signals from one or more RAN nodes 115 to one or more wireless units 128. Downlink RAN signals are received by DAS 100 at host unit 105 from a RAN node 115, which can be an RF source that performs baseband processing such as a baseband unit, a base station (e.g., eNodeB), or base transceiver station (BTS), for example. For simplicity, a single RAN node 115 is often referred to herein, however, it should be understood that the, in some embodiments, the interactions described herein can be performed with multiple RAN nodes 115. The RF source can be a standalone unit or can be implemented as part of a centralized/cloud RAN configuration where multiple baseband units are implemented at a centralized location. The DAS 100 generates transport signals based on the downlink RAN signals and sends the transport signals to each of the active antenna units (AAUs) 110-1 to 110-n. In an example, each of the AAUs 110 in DAS 100 receive identical transport signals. In other examples, one or more subsets of the AAUs 110 receive different transport signals. Each AAU 110 converts the transport signal from the host unit into an analog RF waveform and transmits the RF waveform to one or more of the wireless units 128 as an over-the-air modulated RF signal. Each AAU 110 includes a digital-to-analog converter (DAC) and radiohead hardware to perform the operations for producing the analog modulated RF waveform from the received transport signal and amplifying the analog modulated RF waveform for broadcast as an over-the-air RF signal.

In the uplink direction, each of the active antenna units 110-1 to 110-n senses one or more RF signals from one or more wireless units 128 and generates a respective uplink transport signal based on the one or more RF signals. The AAUs 110 send their respective transport signals to the host unit 105, and the host unit 105 aggregates the information from the transport signals to provide a unified RAN signal to the RAN node 115.

In a digital DAS example, the transport signals sent between the host unit 105 and the AAUs 110 include digital samples corresponding to the modulated analog wireless signals sent and received between the AAUs 110 and the wireless units 128. In the downlink of such an example, the transport signal is a serial data stream including the digital samples. The digital samples can include samples corresponding to a baseband, intermediate frequency (IF), or radio frequency (RF) version of the modulated analog signals. The baseband samples can be complex (I/Q) samples and the IF and RF samples can be real samples.

In the uplink of such an example, each AAU samples the analog RF signals received from one or more wireless units 128 to produce the digital samples for the uplink transport signals. These digital samples are then inserted into a serial data stream to form the uplink transport signal to the host unit 105. In the downlink of such an example, each AAU 110 receives digital samples in a downlink transport signal and generates and transmits the downlink RF over-the-air modulated signal based thereon.

In a first implementation of a digital DAS example, the RAN signals communicated between the RAN node 115 and DAS 100 (i.e., between the RAN node 115 and host unit 105) are modulated analog RF signals. In the downlink of this first implementation, the host unit 105 received a modulated RF signal from the RAN node 115, down converts the RF signal to IF, digitizes (A/D converts) the IF signal to produce real digital IF samples, digitally down-converts the real digital IF samples to produce I/Q (complex) samples, and incorporates the I/Q samples into a downlink transport signal. In some embodiments, the I/Q samples are resampled. In some embodiments, any of the analog signal or digital samples can be filtered to select only a portion of the original bandwidth for transport. In the uplink of this first implementation, the host unit 105 receives an uplink transport signal from one or more of the AAUs 110, extracts the I/Q samples therefrom, digitally up-converts the I/Q samples to product real digital IF samples, D/A converts the real digital IF samples to modulated analog IF signal, up-converts the analog IF signal to an RF signal and sends the RF signal to the RAN node 115. In some embodiments, digital samples from respective transport signals can be digitally summed to form unified data for the RAN node 115

In a second implementation of the digital DAS example, the signals communicated between the host unit 105 and the RAN node 115 carry digital I/Q samples corresponding to a modulated analog signal. In the downlink of this second implementation, the host unit 105 receives a signal from the RAN node 115 including digital I/Q samples (e.g., a CPRI signal) and incorporates the digital I/Q samples into a downlink transport signal to the AAUs 110. In some embodiments, the I/Q samples are resampled. In some embodiments, the digital samples can be filtered to select only a portion of the original bandwidth for transport. In the uplink of this second implementation, the host unit 105 receives an uplink transport signal from one or more AAUs 110, extracts I/Q samples therefrom, and sends the I/Q samples to the RAN node 115 (e.g., in a CPRI signal). In some embodiments digital samples from respective transport signals can be digitally summed to form unified data for the RAN node 115. In other implementations, the RAN signals can conform to a different RAN node communication protocol such as Open Base Station Architecture Initiative (OBSAI) or Open Radio Equipment Interface (ORI).

In any case, in a digital DAS example, the transport signals carry packets of digital samples corresponding to a modulated electromagnetic radio-frequency waveform.

In an analog DAS example, the transport signals between the host unit 105 and the AAUs 110 include a modulated analog IF signal. In such an example, the host unit 105 can send and received modulated analog RF signals with the RAN node 115. The host unit 105 can convert between the modulated RF signals communicated with the RAN node 115 and modulated analog IF signals which are transported between the host unit 105 and the AAUs 110.

In some examples, DAS 100 can be an analog and digital DAS and transport both signals including digital samples and analog modulated IF signals concurrently.

The AAUs 110 perform similar conversions for digital and analog DAS functions respectively. In the uplink of a digital DAS example, an AAU 110 senses a modulated wireless RF signal via an antenna, down converts the RF signal to IF, digitizes (A/D converts) the IF signal to produce real digital IF samples, and incorporates the I/Q samples into an uplink transport signal. In some embodiments, the I/Q samples are resampled. In some embodiments, any of the analog signals or digital samples can be filtered to select only a portion of the original bandwidth for transport. In the downlink of this digital DAS example, the AAU 110 receives a downlink transport signal from the host unit 105, extracts the I/Q samples therefrom, digitally up-converts the I/Q samples to produce real digital IF samples, D/A converts the real digital IF samples to a modulated analog IF signal, up-converts the analog IF signal to an RF signal, amplifies and radiates a wireless RF signal to one or more wireless units 128.

In the uplink of an analog DAS example, an AAU 110 senses a modulated wireless RF signal via an antenna, down converts the RF signal to IF and sends the IF signal in an uplink transport signal to the host unit 105. In the downlink of an analog DAS example, the AAU 110 receives a downlink transport signal from the host unit 105. upconverts an IF signal therein to RF and radiates the RF signal from the antenna as a wireless RF signal.

As shown in FIG. 1, host unit 105 is coupled to AAUs 110-1 to 110-$n$ through bi-directional point-to-point communication links 125. In the particular embodiment shown in FIG. 1, communication links 125 are shown as fiber optic links. However, in other embodiments, other communications means such as but not limited to co-axial cables, twisted pair cables (e.g., CAT-5, CAT-6 cables), or microwave communication links may be utilized in various combinations.

Figures 2, 3:
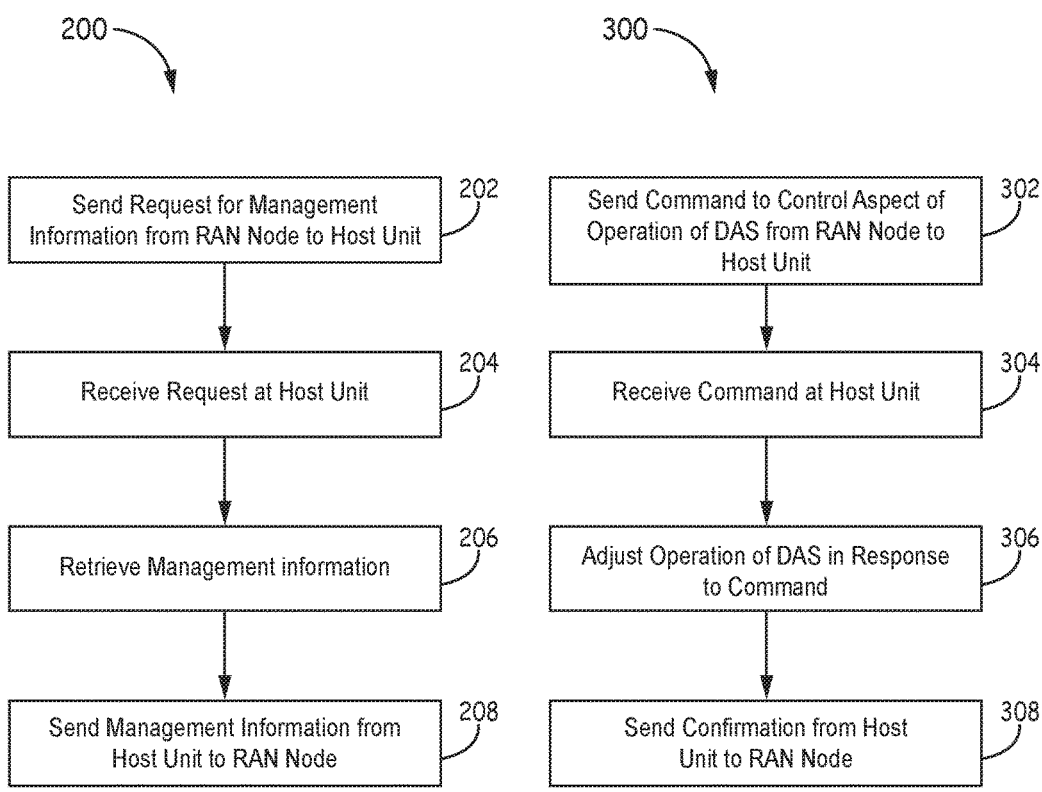
FIG. 2 is a flow diagram of an example method for communicating between the DAS and the RAN nodes of FIG. 1.
FIG. 3 is a flow diagram of another example method for communicating between the DAS and the RAN nodes of FIG. 1.

FIG. 2 is a flow diagram of an example method 200 for communicating between the RAN node 115 and the DAS 100. In particular, method 200 describes a process for communicating management information from the host unit 105 to the RAN node 115. The management information can include one or more of a status of the DAS 100 or configuration information for the DAS 100. Notably, the management information is sent from the host unit 105 to the RAN node 115 in a manner in which the RAN node 115 can receive, unpack, and process the management information. The RAN node 115 can then manage the RF signals originating and received by the RAN node 115 based on the management information.

Examples of management information include configuration information for the DAS 100 such as whether the DAS 100 is deployed in a star, ring, tree and branch, or daisy-chain topology, the transmit power level of one or more of the AAUs 110, the transmit frequency of one or more of the AAUs 110, the receive frequency of one or more of the AAUs 110, the transport delay between the host unit 105 and one or more of the AAUs 110, the timing of reception (e.g., for synchronization with a time-division-duplex protocol), the timing of transmission (e.g., for synchronization with a time-division-duplex protocol), and a location of one or more of the AAUs 110. Management information can also include status and performance information for the DAS 100 such as a location of a mobile device within range of the DAS 100, a measured transmit power (e.g., average or peak) of a signal transmitted by an AAU 110, a measured receive power (e.g., average or peak) of a signal received at an AAU 110 from a mobile device, a power consumption of one or more AAUs 110, a temperature of one or more AAUs 110, and a health of one or more AAUs 110.

In such an example, the RAN node 115 can originate a request for the management information and send the request to the DAS 100 (block 202). The request can be received by the host unit 105 (block 204), and the host unit 105 can retrieve the requested management information in response to the request (block 206). Depending on the management information requested, the host unit 105 may already have the management information, in which case the host unit 105 generates a response message, and sends the response to the RAN node 115 (block 208). Examples of management information in which the host unit 105 may already have include configuration information such whether the DAS 100 is deployed in a star, ring, tree and branch, or daisy-chain topology. Other examples of management information in which the host unit 105 may already have include status information such as whether each of the AAUs 110 are operating, a power level of transmission for one or more of the AAUs 110, and/or an alarm status of each of the AAUs 110. In some examples, the host unit 105 may not have information pertaining to one or more of the AAUs 110. In such a situation, the host unit 105 can send a request for the management information to the one or more AAUs 110. In an example, the request from the host unit 105 can be inserted in one or more time slots that are intended for management data within the downlink transport signal. The one or more AAUs 110 can then respond to the request from the host unit 105 by sending the requested management data in the (respective) uplink transport signal to the host unit 105. Similar to the request from the host unit 105, the response from the AAU(s) 110 can be inserted into one or more time slots that are intended for management data within the (respective) uplink transport signal. In any case, the host unit 105 can retrieve the management information (block 206) and send it to the RAN node 115 (block 208) as discussed above. In other examples, the host unit 105 can send the management information to the RAN node 115 without having first received a request from the RAN node 115.

The request for management information from the RAN node 115 and/or the response including the management information from the host unit 105 can be sent to the host unit 105 in any suitable manner. In examples where the RAN signals sent between the RAN node 115 and the host unit 105 conform to a CPRI protocol, the request and response can be sent via respective control channels (e.g., control and management channels) in the CPRI protocol. In examples where the RAN signals are analog versions of the over-the-air RF signals, the request and response can be sent via an out-of-band signal. As known, an out-of-band signal is a signal that is outside the bandwidth of the analog version of the over-the-air RF signal. In either of the above examples, the request and response can be sent over the same cable or cables between the RAN node 115 and host unit 105 as the RAN signals. In alternative examples, the request and response can be sent over an auxiliary interface coupled between the host unit 105 and the RAN node 115. Such an auxiliary interface can be in addition to an interface (e.g., CPRI) used for the RAN signals. A first cable carrying RAN signals between the RAN node 115 and the host unit 105 can be coupled to the interface used for RAN signals and a second cable carrying auxiliary signals (e.g., containing management information) between the RAN node 115 and the host unit 105 can be coupled to the auxiliary interface. The auxiliary interface can be any suitable interface such as a universal serial bus (USB) interface, an Ethernet interface, or an antenna integrated services group (AISG) interface.

FIG. 3 is a flow diagram of another example method 300 for communicating between the RAN node 115 and the DAS 100. In particular, method 300 describes a process for receive commands from the RAN node 115 at the host unit 105. The commands can originate at the RAN node 115 and can enable the RAN node 115 to control aspects of operation of the DAS 100. These commands can be based on management information received at the RAN node 115 from the DAS 100 as discussed above.

In an example, the RAN node 115 can originate a command to control an aspect of operation of the DAS 100. The RAN node 115 can send the command to the host unit 105 (block 302). The host unit 105 can be configured to receive the command (block 304), and to adjust an aspect of operation of the DAS 100 in response to the command (block 306). The command can be to control any aspect of the DAS 100 that can be controlled electronically. For example, the command can include a command to enable one or more of the AAUs, disable one or more of the AAUs, set (e.g., change) a transmission power level of one or more of the AAUs, select an antenna (e.g., a different antenna that currently used) for use at one or more of the AAUs, set (e.g., change) a transmission frequency of one or more of the AAUs, set (e.g., change) a reception frequency of one or more of the AAUs, set (e.g., change) a transport delay between the RAN node 115 and one or more of the AAUs, set (e.g., change) a timing of transmission (e.g., for synchronization with a time-division-duplex protocol), set a (e.g., change) timing of reception (e.g., for synchronization with a time-division-duplex protocol), set a location of one or more of the AAUs, and set (e.g., change) a direction for an antenna at one or more of the AAUs (e.g., by electronically or mechanically steering the antenna).

In response to receiving the command at the host unit 105 (block 304), the host unit 105 can adjust an aspect of operation of the DAS 100 in response to the command (block 306). In examples where the aspect to be adjusted involves an adjustment at the host unit 105, the host unit 105 can make such an adjustment. In examples where the aspect to be adjusted involves an adjustment at one or more AAUs 110, the host unit 105 can send a command to the one or more AAUs 110 to make the adjustment. For example, in response to the host unit 105 receiving, from the RAN node 115, a command to disable the AAU 110-1, the host unit 105 can send a command to the AAU 110-1 instructing the AAU 110-1 to disable itself. In response to receiving the command from the host unit 105, the AAU 110-1 can disable itself. In some examples, after executing the command, the host unit 105 can send a confirmation back to the RAN node 115 (block 308) indicating that the command was executed successfully.

The command from the RAN node 115 and the confirmation from the host unit 105 can be sent to the host unit 105 in any suitable manner. In examples where the RAN signals sent between the RAN node 115 and the host unit 105 conform to a CPRI protocol, the command and confirmation can be sent via respective control channels (e.g., control and management channels) in the CPRI protocol. In examples where the RAN signals are analog versions of the over-the-air RF signals, the command and confirmation can be sent via an out-of-band signal. As discussed above, an out-of-band signal is a signal that is outside the bandwidth of the analog version of the over-the-air RF signal. In either of the above examples, the command and confirmation can be sent over the same cable or cables between the RAN node 115 and host unit 105 as the RAN signals. In alternative examples, the command and confirmation can be sent over an auxiliary interface coupled between the host unit 105 and the RAN node 115. Such an auxiliary interface can be in addition to an interface (e.g., CPRI) used for the RAN signals. A first cable carrying RAN signals between the RAN node 115 and the host unit 105 can be coupled to the interface used for RAN signals and a second cable carrying auxiliary signals (e.g., containing management information) between the RAN node 115 and the host unit 105 can be coupled to the auxiliary interface. The auxiliary interface can be any suitable interface such as a universal serial bus (USB) interface, an Ethernet interface, or an antenna integrated services group (AISG) interface.

In exemplary embodiments, the over-the-air RF signals may utilize various wireless protocols in various bands of frequency spectrum. For example, the RF signals may include, but are not limited to, licensed RF bands, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 2100 MHz Advanced Wireless Services (AWS), 700 MHz uC/ABC services, two way paging services, video services, Public Safety (PS) services at 450 MHz, 900 MHz and 1800 MHz Global System for Mobile Communications (GSM), 2100 MHz Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), or other appropriate communication services. The system described herein are capable of transporting both Single Input Single Output (SISO) and Multiple Input Multiple Output (MIMO) services at any of the frequencies described above. The systems described herein can support any combination of SISO and MIMO signals across various bands of frequency spectrum. In some example embodiments, the systems described herein may provide MIMO streams for WiMAX, LTE, and HSPA services while only providing SISO streams for other services. Other combinations of MIMO and SISO services are used in other embodiments.

In examples, any of the components herein (e.g., RAN node 115, host unit 105, and/or AAUs 110) may include processors configured to implement the respective functionality described above. These processors may include or function with software programs, firmware or other computer readable instructions for carrying out various methods, process tasks, calculations, and control functions, used in the digital processing functionality described herein. These instructions are typically stored on any appropriate computer readable medium used for storage of computer readable instructions or data structures. The computer readable medium can be implemented as any available media that can be accessed by a general purpose processor (GPP) or special purpose computer or processor (such as a field-programmable gate array (FPGA), application-specific integrated circuit (ASIC) or other integrated circuit), or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless like.

Example Embodiments

Example 1 includes a distributed antenna system (DAS) comprising: a host unit; a plurality of active antenna units (AAUs) communicatively coupled to the host unit over a respective communication link, the AAUs configured to wirelessly communicate with one or more wireless devices, wherein the host unit is configured to bi-directionally communicate RAN signals with one or more RAN nodes, the RAN signals including an analog version of an radio frequency (RF) signal modulated with an over-the-air radio access modulation protocol or digital samples corresponding to an RF signal modulated with an over-the-air radio access modulation protocol, wherein the host unit is configured to convert between the RAN signals and respective transport signals, wherein the host unit is configured to bi-directionally communicate the transport signals with the plurality of AAUs, wherein the plurality of AAUs are configured to bi-directionally communicate the transport signals with the host unit, wherein the plurality of AAUs are configured to convert between the transport signals and the RF signals modulated with the over-the-air radio access modulation protocol, and to transmit and receive the RF signals, wherein the host unit is configured to send management information to the one or more RAN nodes, wherein the one or more RAN nodes are configured to manage the RF signals based on the management information.

Example 2 includes the DAS of Example 1, wherein the host unit is configured to receive a request for the management information from the one or more RAN nodes, wherein the request is generated by the one or more RAN nodes, wherein the host unit is configured to send the management information in response to the request for the management information.

Example 3 includes the DAS of any of Examples 1-2, wherein the RAN signals are communicated in conformance with the common public radio interface (CPRI) protocol, wherein the host unit is configured to send the management information via a control channel of a CPRI implemented by the host unit.

Example 4 includes the DAS of any of Examples 1-3, wherein the RAN signals are an analog version of the RF signals, wherein the host unit is configured to receive the request for management information via an out-of-band signal from the RF signals.

Example 5 includes the DAS of any of Examples 1-4, wherein the host unit is configured to send the management information via an auxiliary interface between the host unit and the one or more RAN nodes.

Example 6 includes the DAS of Example 5, wherein the auxiliary interface is an antenna integrated services group (AISG) interface.

Example 7 includes the DAS of any of Examples 5-6, wherein the auxiliary interface is a universal serial bus (USB) interface or an Ethernet interface.

Example 8 includes the DAS of any of Examples 1-7, wherein the management information includes one or more of a status of the DAS, performance information related to the DAS, and configuration information for the DAS.

Example 9 includes the DAS of Example 8, wherein the configuration information includes one or more of: whether the DAS is deployed in a star, ring, tree and branch, or daisy-chain topology, the transmit power level of one or more of the AAUs, the transmit frequency of one or more of the AAUs, the receive frequency of one or more of the AAUs, the transport delay between the host unit and one or more of the AAUs, the timing of reception, the timing of transmission, and a location of one or more of the AAUs, wherein the status and performance information for the DAS such as a location of a mobile device within range of the DAS, a measured transmit power of a signal transmitted by an AAU, a measured receive power of a signal received at an AAU from a mobile device, a power consumption of one or more AAUs, a temperature of one or more AAUs, and a health of one or more AAUs.

Example 10 includes a distributed antenna system (DAS) comprising: a host unit; a plurality of active antenna units (AAUs) communicatively coupled to the host unit over a respective communication link, the AAUs configured to wirelessly communicate with one or more wireless devices, wherein the host unit is configured to bi-directionally communicate RAN signals with one or more RAN nodes, the RAN signals including an analog version of an radio frequency (RF) signal modulated with an over-the-air radio access modulation protocol or digital samples corresponding to an RF signal modulated with an over-the-air radio access modulation protocol, wherein the host unit is configured to convert between the RAN signals and respective transport signals, wherein the host unit is configured to bi-directionally communicate the transport signals with the plurality of AAUs, wherein the plurality of AAUs are configured to bi-directionally communicate the transport signals with the host unit, wherein the plurality of AAUs are configured to convert between the transport signals and the RF signals modulated with the over-the-air radio access modulation protocol, and to transmit and receive the RF signals, wherein the host unit is configured to receive a command from the one or more RAN nodes, wherein the command is generated by the one or more RAN nodes, wherein the host unit is configured to adjust operation of the DAS in response to the command.

Example 11 includes the DAS of Example 10, wherein the RAN signals are communicated in conformance with the common public radio interface (CPRI) protocol, wherein the host unit is configured to receive the command via a control channel of a CPRI implemented by the host unit.

Example 12 includes the DAS of any of Examples 10-11, wherein the RAN signals are an analog version of the RF signals, wherein the host unit is configured to receive the command via an out-of-band signal from the RF signals.

Example 13 includes the DAS of any of Examples 10-12, wherein the host unit is configured to receive the command via an auxiliary interface between the host unit and the one or more RAN nodes.

Example 14 includes the DAS of Example 13, wherein the auxiliary interface is an antenna integrated services group (AISG) interface.

Example 15 includes the DAS of any of Examples 13-14, wherein the auxiliary interface is one of a universal serial bus (USB) interface or an Ethernet interface.

Example 16 includes the DAS of any of Examples 10-15, wherein the command includes one or more of a command to: enable one or more of the AAUs, disable one or more of the AAUs, set a transmission power level of one or more of the AAUs, select an antenna for use at one or more of the AAUs, set a transmission frequency of one or more of the AAUs, set a reception frequency of one or more of the AAUs, set a transport delay between the one or more RAN nodes and one or more of the AAUs, set a timing of transmission, set a timing of reception, set a location of one or more of the AAUs, and set a direction for an antenna at one or more of the AAUs.

Example 17 includes a method for communication between a distributed antenna system (DAS) and an external baseband unit, the method comprising: at a host unit of the DAS, bi-directionally communicating RAN signals with one or more RAN nodes, the RAN signals including an analog version of an radio frequency (RF) signal modulated with an over-the-air radio access modulation protocol or digital samples corresponding to an RF signal modulated with an over-the-air radio access modulation protocol, at the host unit, converting between the RAN signals and respective transport signals, at the host unit, bi-directionally communicating the transport signals with the plurality of AAUs, wherein the plurality of AAUs are configured to convert between the transport signals and the RF signals modulated with the over-the-air cellular modulation protocol, and to transmit and receive the RF signals, at the host unit, sending management information to the one or more RAN nodes, wherein the one or more RAN nodes are configured to manage the RF signals based on the management information Example 18 includes the method of Example 17, comprising: at the host unit, receiving a request for the management information from the one or more RAN nodes.

Example 19 includes the method of any of Examples 17-18, wherein bi-directionally communicating the RAN signals includes sending and receiving RAN signals that are communicated in conformance with the common public radio interface (CPRI) protocol, wherein sending management information includes sending the management information via a control channel of the CPRI.

Example 20 includes the method of any of Examples 17-19, wherein bi-directionally communicating the RAN signals includes sending and receiving analog versions of the RF signals, wherein sending management information includes sending the management information via an out-of-band signal from the RF signals.

Example 21 includes the method of any of Examples 17-20, wherein sending the management information includes sending the management information via an auxiliary interface between the host unit and the one or more RAN nodes.

Example 22 includes the method of Example 21, wherein the auxiliary interface is an antenna integrated services group (AISG) interface.

Example 23 includes the method of any of Examples 21-22, wherein the auxiliary interface is one of a universal serial bus (USB) interface or an Ethernet interface.

Example 24 includes the method of any of Examples 17-23, wherein sending the management information includes sending one or more of a status of the DAS, performance information related to the DAS, and configuration information for the DAS.

Example 25 includes the method of Example 24, wherein the configuration information includes one or more of: whether the DAS is deployed in a star, ring, tree and branch, or daisy-chain topology, the transmit power level of one or more of the AAUs, the transmit frequency of one or more of the AAUs, the receive frequency of one or more of the AAUs, the transport delay between the host unit and one or more of the AAUs, the timing of reception, the timing of transmission, and a location of one or more of the AAUs, wherein the status and performance information for the DAS such as a location of a mobile device within range of the DAS, a measured transmit power of a signal transmitted by an AAU, a measured receive power of a signal received at an AAU from a mobile device, a power consumption of one or more AAUs, a temperature of one or more AAUs, and a health of one or more AAUs.

Example 26 includes a method for communication between a distributed antenna system (DAS) and an external baseband unit, the method comprising: at a host unit, bi-directionally communicating RAN signals with one or more RAN nodes, the RAN signals including an analog version of an radio frequency (RF) signal modulated with an over-the-air radio access modulation protocol or digital samples corresponding to an RF signal modulated with an over-the-air radio access modulation protocol, at the host unit, converting between the RAN signals and respective transport signals, at the host unit, bi-directionally communicating the transport signals with the plurality of AAUs, wherein the plurality of AAUs are configured to convert between the transport signals and the RF signals modulated with the over-the-air cellular modulation protocol, and to transmit and receive the RF signals, at the host unit, receiving a command from the one or more RAN nodes, wherein the command is generated by the one or more RAN nodes, at the host unit, adjusting operation of the DAS in response to the command.

Example 27 includes the method of Example 26, wherein bi-directionally communicating the RAN signals includes sending and receiving RAN signals that conform to the common public radio interface (CPRI) protocol, wherein receiving the command includes receiving the command via an operations and management channel of a CPRI implemented by the host unit.

Example 28 includes the method of any of Examples 26-27, wherein bi-directionally communicating the RAN signals includes sending and receiving analog versions of the RF signals, wherein receiving the command includes receiving the command via an out-of-band signal from the RF signals.

Example 29 includes the method of any of Examples 26-28, wherein receiving the command includes receiving the command via an auxiliary interface between the host unit and the one or more RAN nodes.

Example 30 includes the method of Example 29, wherein the auxiliary interface is an antenna integrated services group (AISG) interface.

Example 31 includes the method of any of Examples 29-30, wherein the auxiliary interface is one of a universal serial bus (USB) interface or an Ethernet interface.

Example 32 includes the method of any of Examples 26-31, wherein adjusting operation of the DAS in response to the command includes one or more of: enabling one or more of the AAUs, disabling one or more of the AAUs, setting a transmission power level of one or more of the AAUs, selecting an antenna for use at one or more of the AAUs, setting a transmission frequency of one or more of the AAUs, setting a reception frequency of one or more of the AAUs, setting a transport delay between the one or more RAN nodes and one or more of the AAUs, setting a timing of transmission, setting a timing of reception, setting a location of one or more of the AAUs, and setting a direction for an antenna at one or more of the AAUs.

What is claimed is:

1. A host unit for use within a distributed antenna system having a plurality of antenna units configured for communicatively coupling with the host unit over communication links, the host unit comprising:
    circuitry configured to:
        communicate radio access network signals with at least one radio access network node, the radio access network signals including an analog version of a radio frequency signal modulated with at least one of an over-the-air radio access modulation protocol or digital samples corresponding to a radio frequency signal modulated with an over-the-air radio access modulation protocol;
        convert between the radio access network signals and respective transport signals;
        communicate the transport signals with the plurality of antenna units; and
        send management information to the at least one radio access network node, wherein the at least one radio access network node is configured to manage the radio frequency signals based on the management information; and
    wherein the plurality of antenna units are configured to convert between the transport signals and the radio frequency signals modulated with the over-the-air radio access modulation protocol, and to wireless communicate with at least one wireless device using radio frequency signals.

2. The host unit of claim 1, wherein the circuitry is configured to:
    receive a request for the management information from the at least one radio access network node, wherein the request is generated by the at least one radio access network node; and
    send the management information in response to the request for the management information.

3. The host unit of claim 1, wherein the radio access network signals are communicated in conformance with the common public radio interface (CPRI) protocol; and
    wherein the circuitry is configured to send the management information via a control channel of a CPRI implemented by the host unit.

4. The host unit of claim 1, wherein the radio access network signals are an analog version of the radio frequency signals; and
    wherein the circuitry is configured to receive the request for management information via an out-of-band signal from the radio frequency signals.

5. The host unit of claim 1, wherein the circuitry is configured to:
    send management information to the at least one radio access network node via an auxiliary interface between the host unit and the at least one radio access network node.

6. The host unit of claim 5, wherein the auxiliary interface is an antenna integrated services group (AISG) interface.

7. The host unit of claim 5, wherein the auxiliary interface is a universal serial bus (USB) interface or an Ethernet interface.

8. The host unit of claim 1, wherein the management information includes at least one of a status of the distributed antenna system, performance information related to the distributed antenna system, or configuration information for the distributed antenna system.

9. The host unit of claim 8, wherein the configuration information includes at least one of:
whether the distributed antenna system is deployed in a star, ring, tree and branch, or daisy-chain topology;
the transmit power level of at least one of the antenna units;
the transmit frequency of at least one of the antenna units;
the receive frequency of at least one of the antenna units;
the transport delay between the host unit and at least one of the antenna units;
the timing of reception;
the timing of transmission;
a location of at least one of the antenna units; and
status and performance information for the distributed antenna system such as a location of a mobile device within range of the distributed antenna system, a measured transmit power of a signal transmitted by an antenna unit, a measured receive power of a signal received at an antenna unit from a mobile device, a power consumption of at least one antenna unit, a temperature of at least one antenna unit, and a health of at least one antenna unit.

10. A host unit for use within a distributed antenna system having a plurality of antenna units configured for communicatively coupling with the host unit over communication links, the host unit comprising:
circuitry configured to:
communicate radio access network signals with at least one radio access network node, the radio access network signals including an analog version of a radio frequency signal modulated with at least one of an over-the-air radio access modulation protocol or digital samples corresponding to a radio frequency signal modulated with an over-the-air radio access modulation protocol;
convert between the radio access network signals and respective transport signals;
communicate the transport signals with the plurality of antenna units; and
receive a command from the at least one radio access network node via an auxiliary interface between the host unit and the at least one radio access network node, wherein the command is generated by the at least one radio access network node;
adjust operation of the distributed antenna system in response to the command; and
wherein the plurality of antenna units are configured to convert between the transport signals and the radio frequency signals modulated with the over-the-air radio access modulation protocol, and to wireless communicate with at least one wireless device using radio frequency signals.

11. The host unit of claim 10, wherein the radio access network signals are communicated in conformance with the common public radio interface (CPRI) protocol; and
wherein the circuitry is configured to receive the command via a control channel of a CPRI implemented by the host unit.

12. The host unit of claim 10, wherein the radio access network signals are an analog version of the radio frequency signals; and
wherein the circuitry is configured to receive the command via an out-of-band signal from the radio frequency signals.

13. The host unit of claim 10, wherein the auxiliary interface is an antenna integrated services group (AISG) interface.

14. The host unit of claim 10, wherein the auxiliary interface is one of a universal serial bus (USB) interface or an Ethernet interface.

15. The host unit of claim 10, wherein the command includes at least one of a command to:
enable at least one of the antenna units;
disable at least one of the antenna units;
set a transmission power level of at least one of the antenna units;
select an antenna for use at at least one of the antenna units;
set a transmission frequency of at least one of the antenna units;
set a reception frequency of at least one of the antenna units;
set a transport delay between the at least one radio access network node and at least one of the antenna units, set a timing of transmission;
set a timing of reception, set a location of at least one of the antenna units; and
set a direction for an antenna at at least one of the antenna units.

16. A method for communication between a host unit of a distributed antenna system and an external baseband unit, the method comprising:
communicating radio access network signals between the host unit and at least one radio access network node, the radio access network signals including at least one of an analog version of a radio frequency signal modulated with an over-the-air radio access modulation protocol or digital samples corresponding to a radio frequency signal modulated with an over-the air radio access modulation protocol;
converting between the radio access network signals and respective transport signals at the host unit;
communicating the transport signals between the host unit and the plurality of antenna units, wherein the plurality of antenna units are configured to convert between the transport signals and the radio frequency signals modulated with the over-the-air cellular modulation protocol, and to transmit and receive the radio frequency signals; and
sending management information from the host unit to the at least one radio access network node via an auxiliary interface, wherein the at least one radio access network node is configured to manage the radio frequency signals based on the management information.

17. The method of claim 16, wherein sending management information from the host note to the at least one radio access network node occurs via an auxiliary interface between the host node and the at least one radio access network node.

18. The method of claim 16, comprising:
at the host unit, receiving a request for the management information from the at least one radio access network node.

19. A method for communication between a host unit of a distributed antenna system and an external baseband unit, the method comprising:
- communicating radio access network signals between the host unit and at least one radio access network node, the radio access network signals including an analog version of a radio frequency signal modulated with an over-the-air radio access modulation protocol or digital samples corresponding to a radio frequency signal modulated with an over-the-air radio access modulation protocol;
- converting between radio access network signals and respective transport signals at the host unit;
- communicating the transport signals between the host unit and the plurality of antenna units, wherein the plurality of antenna units are configured to convert between the transport signals and the radio frequency signals modulated with the over-the-air cellular modulation protocol and to transmit and receive the radio frequency signals;
- receiving a command from the at least one radio access network node at the host unit via an auxiliary interface between the host unit and the at least one radio access network node, wherein the command is generated by the at least one radio access network node; and
- adjusting operation of the distributed antenna system in response to the command.

* * * * *